United States Patent
Pedrazzini

(10) Patent No.: US 12,071,595 B2
(45) Date of Patent: Aug. 27, 2024

(54) ADDITIVE TO REDUCE PARTICULATE MATTER IN EMISSIONS DERIVING FROM THE COMBUSTION OF DIESEL FUEL AND FUEL OIL AND FUEL COMPOSITION THAT CONTAINS IT

(71) Applicant: PEDRAZZINI CHIMICA S.R.L., Milan (IT)

(72) Inventor: Cesare Pedrazzini, Milan (IT)

(73) Assignee: Pedrazzini Chimica S.R.L., Milan (IT)

( * ) Notice: Subject to any disclaimer, the term of this patent is extended or adjusted under 35 U.S.C. 154(b) by 0 days.

(21) Appl. No.: 18/022,381

(22) PCT Filed: Aug. 23, 2021

(86) PCT No.: PCT/IB2021/057700
§ 371 (c)(1),
(2) Date: Feb. 21, 2023

(87) PCT Pub. No.: WO2022/043849
PCT Pub. Date: Mar. 3, 2022

(65) Prior Publication Data
US 2024/0043761 A1    Feb. 8, 2024

(30) Foreign Application Priority Data
Aug. 24, 2020  (IT) .................... 102020000020368

(51) Int. Cl.
*C10L 1/10*  (2006.01)
*C10L 1/23*  (2006.01)
*C10L 1/24*  (2006.01)

(52) U.S. Cl.
CPC ............. *C10L 1/2437* (2013.01); *C10L 1/231* (2013.01); *C10L 2200/0446* (2013.01); *C10L 2230/22* (2013.01)

(58) Field of Classification Search
CPC ................... C10L 1/231; C10L 1/2437; C10L 2200/0446; C10L 2230/22
See application file for complete search history.

(56) References Cited

FOREIGN PATENT DOCUMENTS

| CN | 101250448 A | 8/2008 | |
|---|---|---|---|
| WO | WO-9932584 A1 * | 7/1999 | ............... C10L 1/14 |
| WO | 0212417 A1 | 2/2002 | |
| WO | WO-0212417 A1 * | 2/2002 | ............... C10L 1/14 |

* cited by examiner

*Primary Examiner* — Ellen M McAvoy
*Assistant Examiner* — Chantel Graham
(74) *Attorney, Agent, or Firm* — Elmore Patent Law Group, P.C.; Joseph C. Zucchero; Carolyn S. Elmore

(57) ABSTRACT

The present invention relates to an additive for fuels such as diesel fuel and fuel oil, used respectively for diesel engines and boilers of various types, comprising a metal oxidation catalyst, an organic nitrate and a dispersing agent in suitable ratios, capable of improving combustion efficiency in such a way as to reduce the formation of particulate matter and consumption.

20 Claims, No Drawings

ADDITIVE TO REDUCE PARTICULATE MATTER IN EMISSIONS DERIVING FROM THE COMBUSTION OF DIESEL FUEL AND FUEL OIL AND FUEL COMPOSITION THAT CONTAINS IT

FIELD OF THE INVENTION

The present invention relates to an additive for fuels such as diesel fuel and fuel oil, used respectively for diesel engines and boilers for civil and industrial purposes, useful for reducing particulate emissions and reducing consumption.

STATE OF THE ART

Diesel fuel and fuel oil are fuels widely used in various sectors, from automotive to civil or industrial heating.

For the sake of simplicity, in what follows, reference will only be made to the use of diesel fuel in internal combustion engines (diesel cycle engines), it being understood, however, that what will be said is extended equally to any use of diesel fuel and fuel oils, in which the combustion process results in emissions.

In recent years, the technical development of alternative internal combustion engines has been closely linked to the pressing need to ensure an increasingly rational use of natural energy sources, while limiting the effects of environmental pollution resulting from their exploitation. This has entailed the introduction of substantial technical modifications to the engine, affecting spark ignition engines, i.e., petrol engines, and compression ignition engines, i.e., diesel engines, in a different way. Therefore, the relative technical innovations, although arising from the same needs, have followed profoundly different paths.

The different ways of tackling these issues originate from the different trend of the combustion process in petrol engines compared to diesel engines.

In diesel engines, unlike to what happens in petrol engines, the charge formation process occurs in the form of very small drops of fuel that burn under conditions of high excesses of air due to the high temperature reached by the latter during the compression phase.

In spite of the very small drop size of one hundredth of a millimetre in diameter, which is achieved through very high injection pressures (up to 2300 atmospheres), the process by which they are distributed inside the combustion chamber is far from being uniform. The consequence of this is that there are areas of the combustion chamber in which, even in the presence of considerable excesses of air, the oxidation process of the diesel fuel occurs only partially.

The nuclei of the fuel particles not yet reached by the oxidation process, being simultaneously under conditions of both high temperature and lack of oxygen, undergo complex cracking phenomena (pyrolysis) which substantially modify their original chemical-physical structure.

It is this phenomenon that is generally considered to be the primary cause of the formation of those characteristic material particles, carbonaceous in nature, emitted at the exhaust of diesel engines, technically defined as "particulate matter", although they are more commonly known as soot or carbon black. In the context of the "particulate matter", the PM 10 fraction, consisting of particles with an average diameter of less than 10 microns containing approximately 75% benzopyrene, acenaphthene, anthracene, phenanthrene, and higher homologues of polycyclic aromatic hydrocarbons with proven carcinogenic activity, is particularly harmful.

In spite of the high values of the dosing ratio and of the considerable efforts made to improve the efficiency of the combustion process, the carbonaceous particulate matter responsible for the smokiness is always present to a greater or lesser extent in the exhaust of diesel engines and is not only clear evidence of poor energy utilisation of the fuel but also a cause of considerable environmental degradation and serious damage to health.

As the carbonaceous particulate matter is one of the main harmful emissions of diesel engines, the major efforts made in recent years by vehicle manufacturers have essentially turned towards the abatement of this pollutant.

Historically, the measures adopted in order to reduce the carbonaceous particulate matter in the exhaust of diesel engines have consisted essentially of the following interventions: a) direct intervention in the combustion process in the engine in order to prevent the formation of pollutants; b) application of combustion gas treatment devices in order to convert harmful substances into harmless products; c) modification of the composition of the fuel.

The measures implemented to improve the efficiency of the combustion process belong to the interventions under category a), since it is the incompleteness of this process that is primarily responsible for the formation of PM 10 particulate matter.

On the other hand, the combustion gas treatment devices applied to the diesel engine exhaust, known as "particulate traps", which filter and eliminate the carbonaceous particles formed in the engine during the combustion process, belong to the interventions under category b).

PM 10 particulate traps generally consist of a porous ceramic substrate which has a plurality of parallel channels, alternately closed and open at the ends, on the walls of which the particulate matter is deposited by filtration. To prevent the material accumulated in the support from creating excessive back pressure in the engine exhaust, with consequent power loss and increased fuel consumption, the operation of the traps always includes a cycle of particulate elimination ("cleaning" phase), also known as the "regeneration process", during which, with appropriate technical measures, the particulate matter is burnt and converted into carbon dioxide and water.

Type c) interventions include supplementing fuels either with emulsions or the use of additives comprising oxidation catalysts. EP 1 307 531, for example, describes an additive for diesel fuel and fuel oil comprising a mixed metal oxidation catalyst based on iron, cerium, calcium, at least one organic nitrate, and a dispersing agent.

However, the solutions provided to date for the elimination of particulate matter from exhaust gases, as summarily indicated above, still have certain application limits. In particular, in the interventions a) mentioned above, the chemical-physical characteristics of the fuel in the heterogeneous phase constitute an insurmountable limit to the increase in reactivity and therefore to the efficiency of the engine. As far as type b) interventions are concerned, the construction of combustion gas treatment devices has so far proved to be too expensive from an economic point of view for a large-scale use to be conceivable. Finally, supplementing fuels does not always lead to a satisfactory reduction in particulate matter and, in the case of additives comprising metal oxidation catalysts, however, leads to the formation of metal oxides which, although to a lesser extent, are still a source. The use of additives also greatly increases the risk of corrosion of the engine or of the burners. Finally, the supplemented fuels can suffer from the formation of deposits due to the instability of the additives, which can break down or form precipitates over time, thus precluding the possibility of supplementing the fuel directly downstream of the production site, before transport and use.

On the other hand, an effective solution for reducing pollutants in diesel engine exhausts is made all the more urgent by the increasingly stringent national and EU anti-smog regulations, which are becoming increasingly severe.

The need to find a solution for limiting the emissions of pollutants from diesel engine exhausts even in the face of these regulations is therefore very strong.

SUMMARY OF THE INVENTION

The Applicant has now found that the use of a diesel engine fuel additive (diesel fuel) consisting of a metal catalyst comprising a binary mixture of iron and cerium salts, an organic nitrate and a dispersing agent in specific and suitable ratios, improves the combustion efficiency, thereby significantly reducing particulate matter production and decreasing fuel consumption, and provides numerous other advantages over the additives of the prior art.

In particular, in a first aspect thereof, the present invention relates to an additive for diesel fuel and fuel oil, comprising:
A) from 2 to 12% by weight, with respect to the sum of components A), B) and C), of an oxidation catalyst comprising a mixture of salts of at least one iron salt, and at least one cerium salt;
B) from 82 to 92% by weight, with respect to the sum of components A), B) and C), of at least one organic nitrate,
C) from 6 to 16% by weight, with respect to the sum of components A), B) and C), of at least one dispersing agent.

This additive was not only particularly effective in reducing particulate matter emission, but also proved useful in favouring every single phase of the combustion process, thus obtaining a better degree of cleanliness in the so-called low temperature zones, and better heat exchange conditions due to the drastic reduction in fouling caused by the reduction of residues and of unburnt carbonaceous matter in the cylinders and in the exhaust manifolds.

Moreover, thanks to the reduced oxidation catalyst content, the additive according to the present invention allows obtaining a reduction in the emissions while using smaller quantities of metals, thereby leading to the consequent lower generation of metal oxides, and thus allowing less fouling of the particulate systems.

Finally, the additive according to the present invention has shown an unexpectedly high chemical-physical stability over time, which allows it to be used even in phases that are far upstream of the product chain, directly downstream of the production site, before transport. This has the advantage of not creating problems during storage and allows the manufacturer to market a fuel that does not require being supplemented with additives before use by the user.

In a further aspect, the present invention further relates to a fuel composition comprising a fuel selected from the group consisting of: diesel fuel, and fuel oil, and an additive according to the first aspect of the invention.

The advantages of the fuel composition according to the present invention are apparent from the characteristics of the additive according to the first aspect of the invention and are not repeated herein.

However, the Applicant has also found that the specific compositional characteristics of the additive according to the present invention make it effective even at low concentrations, thereby also making its use economically advantageous.

In further aspects, the present invention relates to the use of the additive according to the first aspect of the invention for improving the combustion efficiency in diesel fuel in diesel engines and of fuel oil for boilers, as well as a to a method for improving the combustion efficiency of a fuel selected from diesel fuel and fuel oil, comprising the step of adding the additive according to the present invention to said fuel.

The features and advantages of the present invention, in addition to the other advantages already highlighted above, will be detailed in the following description.

DETAILED DESCRIPTION OF THE INVENTION

In a first aspect thereof, the present invention relates to an additive for diesel fuel and fuel oil, comprising:
A) from 2 to 12% by weight, with respect to the sum of components A), B) and C), of an oxidation catalyst comprising a mixture of salts of at least one iron salt, and at least one cerium salt;
B) from 82 to 92% by weight, with respect to the sum of components A), B) and C), of at least one organic nitrate,
C) from 6 to 16% by weight, with respect to the sum of components A), B) and C), of at least one dispersing agent.

This additive was not only particularly effective in reducing particulate matter emission, but also proved useful in favouring every single phase of the combustion process, thus obtaining a better degree of cleanliness in the so-called low temperature zones, and better heat exchange conditions due to the drastic reduction in fouling caused by the reduction of residues and of unburnt carbonaceous matter in the cylinders and in the exhaust manifolds.

Moreover, thanks to the reduced oxidation catalyst content, the additive according to the present invention allows obtaining a reduction in the emissions while using smaller quantities of metals, thereby leading to the consequent lower generation of metal oxides, and thus allowing less fouling of the particulate systems.

Finally, the additive according to the present invention has shown an unexpectedly high chemical-physical stability over time, which allows it to be used even in phases that are far upstream of the product chain, directly downstream of the production site, before transport. This has the advantage of not creating problems during storage and allows the manufacturer to market a fuel that does not require being supplemented with additives before use by the user.

Within the context of the present description and following claims, all the numerical magnitudes indicating quantities, parameters, percentages, and so on are to be considered preceded in every circumstance by the term "about" unless indicated otherwise. Further, all the ranges of numerical magnitudes include all the possible combinations of maximum and minimum numerical values and all the possible intermediate ranges, as well as those indicated below.

The present invention can show in one or more of its aspects or one or more of the preferred characteristics reported below, which can be combined with one another according to the application requirements.

Preferably, in the oxidation catalyst A), said at least one iron salt and said at least one cerium salt are salts of acids selected from the group consisting of:

(I) R-COOH in which R is a linear or branched, saturated or unsaturated $C_7$-$C_{17}$ aliphatic radical, or is a $C_5$-$C_{12}$ alicyclic radical, and

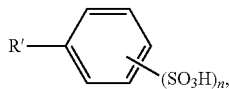

(II)

wherein R' is H or a linear or branched, saturated or unsaturated $C_1$-$C_{12}$ aliphatic radical, and n is an integer number from 1 to 5.

Preferably, the iron salt is an acid of formula (I) in which R is a linear saturated $C_{17}$ aliphatic radical, and the cerium salt is an acid of formula (II) in which R' is a linear saturated $C_{12}$ aliphatic radical and n is an integer number equal to 1.

The acids of formula (I) and (II) may also be present in mixtures in natural products.

Preferably, the quantity of cerium in the oxidation catalyst A), expressed as weight percentage of metal cerium with respect to the total weight of the catalyst, ranges from 0.1 to 1.2%, more preferably from 0.2 to 1%, even more preferably from 0.3 to 0.8%.

Preferably, the quantity of iron in the oxidation catalyst A), expressed as weight percentage of metal iron with respect to the total weight of the catalyst, ranges from 0.1 to 1.2%, more preferably from 0.2 to 1%, even more preferably from to 0.8%.

In a preferred embodiment of the invention, the quantity of metals in the oxidation catalyst A), expressed as weight percentage of metal iron and cerium with respect to the total weight of the catalyst, ranges from 0.1 to 1.2% of cerium and 0.1 to 1.2% of iron, more preferably from 0.2 to 1% of cerium and to 1% of iron, even more preferably from 0.3 to 0.8% of cerium and 0.3 to of iron.

Preferably, in the oxidation catalyst A) the weight ratio between cerium and iron ranges from 0.8 to 1.2, more preferably it ranges from 0.9 to 1.1, optimally it is about 1.

Preferably, the organic nitrate B) of the additive according to the invention is selected from the group consisting of n-amyl nitrate, i-amyl nitrate, and i-octyl nitrate, (i.e., 2-ethylhexyl alcohol nitrate), and binary or ternary mixtures thereof. Preferred nitrate is i-octyl nitrate.

Preferably, the dispersing agent C) is selected from alkyl amines, alkyl amides, alkyl aryl amines and alkyl aryl amides, and mixtures thereof. Particularly preferred dispersing agents C) according to the invention are alkyl amides and alkyl amines with $C_{10}$-$C_{24}$ aliphatic chain.

The dispersant C) generally causes an increase in the activity of (A)+(B). A particularly high synergistic effect was obtained by adding a dispersing product based on polyolefinamines or alkylarylamines and an olefin-alkyl ester copolymer to the mixture of organic nitrates and metal catalysts as described above. Products suitable for carrying out the present invention are for example those available on the market under the name Wax AntiSettling Agents (WASA).

The additive according to the present invention, in addition to the essential components indicated above, may contain, and generally contains, small quantities of agents suitable for improving specific aspects of the mixture such as oxidation stability, corrosion inhibition, lubricity, and the foaminess of the fuel (antifoam).

Preferably, the additive according to the present invention does not contain calcium salts. The Applicant has in fact surprisingly found that the addition of calcium salts can give rise to the formation of a precipitate in the diesel fuel, thereby deteriorating its properties and reducing the stability of the supplemented diesel fuel over time.

Preferably, in the additive according to the present invention the quantity of oxidation catalyst A) is comprised between 3 and 12% by weight, more preferably between 3 and 9% by weight, optimally it is equal to about 5% by weight.

Preferably, in the additive according to the present invention the quantity of organic nitrate B) is comprised between 82 and 91% by weight, more preferably between 84 and 90% by weight, optimally it is equal to about 86% by weight.

Preferably, in the additive according to the present invention the quantity of dispersing agent C) is comprised between 6 and 15% by weight, more preferably between 7 and 13% by weight, optimally it is equal to about 9% by weight.

In a preferred embodiment of the invention, in the additive according to the present invention the quantity of oxidation catalyst A) is comprised between 3 and 12% by weight, the quantity of organic nitrate B) is comprised between 82 and 91% by weight, and the quantity of dispersing agent C) is comprised between 6 and 15% by weight, with respect to the total weight of the additive, more preferably the quantity of oxidation catalyst A) is comprised between 3 and 9% by weight, the quantity of organic nitrate B) is comprised between 84 and 90% by weight, and the quantity of dispersing agent C) is comprised between 7 and 13% by weight, with respect to the total weight of the additive, and optimally the quantity of oxidation catalyst A) is equal to about 5% by weight, the quantity of organic nitrate B) is equal to about 86% by weight, and the quantity of dispersing agent C) is equal to about 9% by weight, with respect to the total weight of the additive.

The additive according to the present invention is suitable for use with any diesel engine fuel or any boiler fuel oil for civil and industrial purposes.

In a further aspect, the present invention further relates to a fuel composition comprising a fuel selected from the group consisting of: diesel fuel, and fuel oil, and at least one additive according to the first aspect of the invention.

The advantages of the fuel composition according to the present invention are apparent from the characteristics of the additive according to the first aspect of the invention and are not repeated herein.

However, the Applicant has also found that the specific compositional characteristics of the additive according to the present invention make it effective even at low concentrations, thereby also making its use economically advantageous.

Preferably, the additive according to the invention can be added to the fuel in a quantity comprised between 1 and 10 g/l of fuel; more preferably in a quantity comprised between 1 and 5 g/l of fuel, and even more preferably in a quantity equal to about 2 g/l, allowing an effective reduction of particulate matter to be obtained.

The Applicant has, in particular, surprisingly found that, at the same concentration of use, the additive according to the present invention obtains generally better performances than other similar additives of the prior art, such as, for example, the one according to EP 1 307 531 and, because of this, that it is even possible to obtain performances similar to those of the latter if used at concentrations indicatively lower than 50% with respect thereto. Due to the reduced metal content of the additive according to the present invention, this leads to the consequent lower generation of metal oxides, and thus allows for less fouling of the particulate systems.

The fuel composition of the invention may also contain additional additives conventionally used for diesel engine fuel, in the quantities with which they are generally used. For example, it may contain conventional additives such as additional lubricity and stability enhancing agents, corrosion inhibitors and the like.

The additive according to the invention, when mixed with diesel engine fuel, drastically reduces particulate matter in the emissions of diesel engines for motor vehicles, locomotives, ships, earth-moving machinery, but also of diesel engines used in pumping stations or installations for generating electricity. The additive according to the invention can also be used with the same advantageous results as above to reduce particulate matter emitted by heating systems fuelled by diesel fuel, since the combustion mechanisms of diesel fuel in boilers fuelled by this fuel are similar to those governing the oxidation process in an internal combustion engine, albeit with a much lower air/fuel ratio.

In further aspects, the present invention relates to the use of the additive according to the first aspect of the invention for improving the combustion efficiency in diesel fuel in diesel engines and of fuel oil for boilers, as well as a to a method for improving the combustion efficiency of a fuel selected from diesel fuel and fuel oil, comprising the step of adding the additive according to the present invention to said fuel.

Preferably, in said method for improving the combustion efficiency of a fuel, in said step of adding from 1 to 10 g/l of said at least one additive are added to the fuel, more preferably from 1 to 5 g/l, and optimally about 2 g/l of said at least one additive.

The invention is now described by means of some examples to be considered for non-limiting illustrating purposes thereof.

EXPERIMENTAL PART

Example 1—Measurement of Pollutant Emission and Opacity Test

In order to illustrate the properties of the additive according to the present invention, emissions of regulated pollutants were measured and smoke opacity tests were carried out in a comparative test in which an additive according to the invention was added to a standard reference diesel fuel, and the results obtained were then compared with those obtained from the standard reference diesel fuel alone, in the absence of the additive according to the invention, and the % variation in performance under the same conditions was then calculated, in order to highlight the improvements obtained through the use of the additive.

The tests were carried out on an engine brake bench using a Cummins C110 D5 (6B) engine, using the following six different engine power levels:

| Level | Power (kW) |
|---|---|
| 6 | 78 |
| 5 | 64 |
| 4 | 50 |
| 3 | 41 |
| 2 | 27 |
| 1 | 13 |

In countries that provides for compulsory field testing, the verification of the diesel vehicle covers not only the values of the regulated pollutants but also the measurement of diesel smoke opacity. The opacity was measured using a special instrument, the opacimeter, in which the exhaust gas taken by a probe is conveyed into the measuring chamber; the light path inside the chamber undergoes a variation based on the colour and density of the gas; the absorption degree depends on the opacity. In this example, a TESTO model 338 diesel smoke meter was used (https://www.testo.com/it-IT/testo-338/p/0632-3381).

Light weakening was measured by said instrument as a carbon black index (FSN) or Bosch index, and as a mass concentration of soot per unit volume (mg/m$^3$).

As an additive according to the invention, a mixture was used constituted as follows:

A) oxidation catalyst consisting of a binary mixture of iron and cerium salts, in the form of an acid of formula (I) in which R is a linear saturated $C_{17}$ aliphatic radical for the iron and of an acid of formula (II) in which R' is a linear saturated $C_{12}$ aliphatic radical and n is an integer number equal to 1 for cerium. In the catalyst, the iron content (expressed as weight percentage of metal iron with respect to the total weight of the catalyst) was 0.4%, and the cerium content (expressed as weight percentage of metal cerium with respect to the total weight of the catalyst) was 0.4%. The catalyst is present in the additive in a quantity equal to 5% by weight with respect to the total weight of the additive;

B) i-octyl nitrate in a quantity equal to 86% by weight with respect to the total weight of the additive;

C) a commercially available Wax AntiSettling Agent (WASA) (Infineum R715) was used as dispersing agent in a quantity equal to 9% by weight with respect to the total weight of the additive.

The aforesaid additive was added to the diesel fuel in a quantity equal to 2 g/l of diesel fuel (the data relating thereto are hereinafter referred to as "Diesel fuel+additive").

As a comparison, the tests were also carried out on the same diesel fuel, without the additive according to the present invention (the data relating thereto are hereinafter referred to as "Diesel fuel"). The data were then compared by determining the % variation in performance between the supplemented diesel fuel according to the invention and the diesel fuel without the additive (the data relating thereto are hereinafter referred to as "Variation"), calculated according to the following equation:

$$\text{Variation} = (\text{datum}_{Diesel\ fuel} - \text{datum}_{Diesel\ fuel+additive}) / \text{datum}_{Diesel\ fuel} * 100$$

The results obtained have been reported in the following tables 1 and 2.

TABLE 1

Measurement of pollutant emissions

| | | | \multicolumn{6}{c}{Engine power level} | | | | | |
|---|---|---|---|---|---|---|---|---|
| | | | 6 | 5 | 4 | 3 | 2 | 1 |
| NOx | Diesel fuel | ppm | 475.35 | 700.81 | 956.19 | 1085.41 | 1279.48 | 1235.26 |
| | Diesel fuel + additive | ppm | 467.15 | 727.84 | 962.90 | 1101.06 | 1281.60 | 1261.84 |
| | Variation | % | −1.8 | 3.7 | 0.7 | 1.4 | 0.2 | 2.2 |
| SO2 | Diesel fuel | ppm | 0.88 | 0.22 | 0.00 | 0.07 | −0.20 | 0.07 |
| | Diesel fuel + additive | ppm | 0.58 | 0.17 | −0.11 | 0.15 | 0.02 | 0.86 |
| | Variation | % | −52.7 | −33.9 | −96.8 | 49.8 | 110.0 | 92.4 |
| CO | Diesel fuel | ppm | 144.48 | 94.46 | 67.22 | 62.88 | 51.34 | 100.20 |
| | Diesel fuel + additive | ppm | 138.53 | 85.49 | 66.05 | 60.20 | 50.25 | 76.91 |
| | Variation | % | −4.1 | −9.5 | −1.7 | −4.2 | −2.1 | −23.2 |
| CO2 | Diesel fuel | ppm | 4.08 | 5.58 | 6.80 | 7.48 | 8.34 | 8.93 |
| | Diesel fuel + additive | ppm | 4.07 | 5.58 | 6.78 | 7.40 | 8.15 | 8.59 |
| | Variation | % | −0.3 | −0.1 | −0.3 | −1.0 | −2.3 | −3.8 |
| O2 | Diesel fuel | ppm | 16.08 | 13.86 | 12.06 | 11.09 | 9.86 | 8.98 |
| | Diesel fuel + additive | ppm | 16.06 | 13.83 | 12.03 | 11.09 | 10.00 | 9.28 |
| | Variation | % | −0.2 | −0.2 | −0.3 | 0.1 | 1.4 | 3.3 |
| THC | Diesel fuel | ppm | 32.60 | 30.44 | 35.14 | 38.00 | 42.37 | 57.69 |
| | Diesel fuel + additive | ppm | 25.29 | 18.05 | 21.97 | 19.49 | 26.63 | 40.52 |
| | Variation | % | −28.9 | −68.7 | −60.0 | −95.0 | −59.1 | −42.4 |

TABLE 2

Opacity test

| | \multicolumn{3}{c}{Bosch index} | | \multicolumn{3}{c}{concentration soot [mg/m$^3$]} | |
|---|---|---|---|---|---|---|
| Engine power level | Diesel fuel | Diesel fuel + additive | Variation [%] | Diesel fuel | Diesel fuel + additive | Variation [%] |
| 6 | 1.59 | 0.81 | −49.06 | 33.20 | 12.88 | −61.20 |
| 5 | 0.84 | 0.33 | −60.71 | 14.10 | 4.75 | −66.31 |
| 4 | 0.83 | 0.38 | −54.22 | 13.69 | 5.45 | −60.19 |
| 3 | 0.70 | 0.38 | −45.71 | 11.05 | 5.39 | −51.22 |
| 2 | 0.57 | 0.07 | −87.72 | 8.73 | 0.96 | −89.00 |
| 1 | 0.46 | ND$^a$ | −100 | 6.88 | ND$^a$ | −100 |

$^a$value below the instrument's detection limit

From the analysis of the data in Tables 1 and 2, it is readily apparent that the additive according to the present invention, under all the conditions tested, proved to be effective in significantly reducing pollutant and particulate matter emissions.

Example 2—Comparison with Additive According to EP 1 307 53

In order to further illustrate the advantages linked to the additive according to the present invention compared to the additives of the prior art, a comparative test was carried out between the additive according to Example 1 of the present application ("AddInv", Additive according to the Invention) and the additive according to EP 1 307 531 ("AddEP531", Additive according to EP 1 307 531) having the following composition:
 a) metal oxidation catalyst consisting of 5% Ce, 7% Fe, 2.5% Ca, in the form of salts of aliphatic acids $C_8$ for Ce, $C_{18}$ for Fe, and dodecylbenzenesulfonic acid for Ca. The catalyst is present in the additive in a quantity of 10% by weight with respect to the total weight of the additive; and
 b) i-octyl nitrate in a quantity equal to 70% by weight with respect to the total weight of the additive;
 c) Para-Flow 412 (Exxon) (50% of active substance) was used as dispersant in a quantity of 20% by weight with respect to the total weight of the additive.

Both additives were added to a standard reference diesel fuel; the additive AddInv was added in a quantity equal to 2 g/l diesel fuel, while the additive AddEP531 was added in a quantity equal to 3.5 g/l of diesel fuel, as taught in the examples of EP 1 307 531. EP 1 307 531 also teaches that 3.5 g/l is the preferred quantity of additive (see EP 1 307 531 A1).

The results obtained with the two different additives were then compared with those obtained with the diesel fuel alone and, in addition, by comparing the two additives with each other, calculating, in order to highlight the improvements obtained by using the additive according to the present invention, the % variation in performance under the same conditions of the two respective additives compared to not supplemented diesel fuel according to the equation already used in Example 1:

$$\text{Variation on diesel fuel} = (\text{datum}_{Diesel\ fuel} - \text{datum}_{Diesel\ fuel+additive})/\text{datum}_{Diesel\ fuel} * 100$$

and further calculating the performance improvement factor of the additive according to the invention compared to the additive according to EP 1 307 531 according to the following equation:

$$\text{Improvement [\%]} = ((\text{variation}_{Diesel\ fuel+AddInv}/\text{Variation}_{Diesel\ fuel+AddEP}531) - 1) * 100$$

The tests were carried out on an engine brake bench that used an Isotta Fraschini model V1312 T2 MLL engine, using a constant engine power rate of 50%. The engine consumption and smoke opacity data (FSN scale, mg/m$^3$) were measured and compared.

The results obtained have been reported in the following Tables 3, 4 and 5.

TABLE 3 test with AddInv

| | FSN [mg/m$^3$] | Consumption [g/kwh] |
|---|---|---|
| Diesel fuel | 53.4 | 219 |
| Diesel fuel + AddInv | 21 | 170 |
| Variation [%] | −60.7 | −22.4 |

TABLE 4 test with AddEP531

| | FSN [mg/m$^3$] | Consumption [g/kwh] |
|---|---|---|
| Diesel fuel | 221.61 | 216 |
| Diesel fuel + AddEP531 | 113.96 | 174 |
| Variation [%] | −48.3 | −19.4 |

TABLE 5 comparison AddInv – AddEP5311

| | Variation on FSN [%] | Variation on Consumption [%] |
|---|---|---|
| Diesel fuel + AddEP531 | −48.3 | −19.4 |
| Diesel fuel + AddInv | −60.7 | −22.4 |
| Improvement [%] | +25 | +15 |

From the analysis of the data in Tables 3, 4, and 5, it is readily apparent that the additive according to the present invention has proved to be much more effective than the additive according to EP 1 307 531 in significantly reducing fuel consumption and particulate matter emissions, together with a significant reduction in pollutant emissions, already shown in Example 1, and while using smaller quantities of metals, thereby also leading to a consequent significant reduction in the generation of metal oxides.

The invention claimed is:

1. A diesel fuel and fuel oil additive, comprising:
   A) from 2 to 12% by weight, of an oxidation catalyst comprising a mixture of salts of at least one iron salt, and at least one cerium salt;
   B) from 82 to 92% by weight, of at least one organic nitrate; and
   C) from 6 to 16% by weight, of at least one dispersing agent, wherein the dispersing agent C) is selected from alkyl amines, alkyl amides, alkyl aryl amines, alkyl aryl amides, or mixtures thereof.

2. The additive according to claim 1, wherein said at least one iron salt and said at least one cerium salt are salts of acids selected from the group consisting of:
   (I) R-COOH in which R is a linear or branched, saturated or unsaturated $C_7$-$C_{17}$ aliphatic radical, or is a $C_5$-$C_{12}$ alicyclic radical, and

(II)

wherein R' is H or a linear or branched, saturated or unsaturated $C_1$-$C_{12}$ aliphatic radical, and n is an integer number from 1 to 5.

3. The additive according to claim 2, wherein the iron salt is an acid of formula (I) in which R is a linear saturated $C_{17}$ aliphatic radical, and the cerium salt is an acid of formula (II) in which R' is a linear saturated $C_{12}$ aliphatic radical and n is an integer number equal to 1.

4. The additive according to claim 1, wherein the quantity of metals in the oxidation catalyst A), expressed as weight percentage of metal iron and cerium with respect to the total weight of the catalyst, ranges from 0.1 to 1.2% of cerium and from 0.1 to 1.2% of iron.

5. The additive according to claim 4, wherein the quantity of metals in the oxidation catalyst A), expressed as weight percentage of metal iron and cerium with respect to the total weight of the catalyst, ranges from 0.3 to 1% of cerium and from 0.3 to 1% of iron.

6. The additive according to claim 1, wherein in said oxidation catalyst A) the weight ratio between cerium and iron ranges from 0.8 to 1.2.

7. The additive according to claim 1, wherein the organic nitrate B) is selected from the group consisting of amyl nitrate, i-amyl nitrate, i-octyl nitrate, or binary or ternary mixtures thereof.

8. The additive according to claim 7, wherein the organic nitrate B) is i-octyl nitrate.

9. The additive according to claim 1, wherein the dispersing agent C) is selected from alkyl amines and alkyl amides with $C_{10}$-$C_{24}$ aliphatic chain.

10. The additive according to claim 1, wherein the quantity of oxidation catalyst A) is comprised between 3 and 12% by weight, the quantity of organic nitrate B) is comprised between 82 and 91% by weight, and the quantity of dispersing agent C) is comprised between 6 and 15% by weight, with respect to the total weight of the additive.

11. The additive according to claim 10, wherein the quantity of oxidation catalyst A) is comprised between 3 and 9% by weight, the quantity of organic nitrate B) is comprised between 84 and 90% by weight, and the quantity of dispersing agent C) is comprised between 7 and 13% by weight, with respect to the total weight of the additive.

12. The additive according to claim 11, wherein the quantity of oxidation catalyst A) is equal to 5% by weight, the quantity of organic nitrate B) is equal to 86% by weight, and the quantity of dispersing agent C) is equal to 9% by weight, with respect to the total weight of the additive.

13. A fuel composition comprising a fuel selected from the group consisting of diesel fuel and fuel oil, and an at least one additive according to claim 1.

14. The fuel composition according to claim 13, wherein the quantity of additive is comprised between 1 and 10 g/l of fuel.

15. The fuel composition according to claim 14, wherein the quantity of additive is comprised between 1 and 5 g/l of fuel.

16. The fuel composition according to claim 15, wherein the quantity of additive is equal to 2 g/l of fuel.

17. A method for improving the combustion efficiency of a fuel selected from diesel fuel and fuel oil, comprising the step of adding to said fuel at least one additive according to claim 1.

18. The method according to claim 17, wherein in said step of adding from 1 to 10 g/l of said at least one additive are added to the fuel.

19. The method according to claim 18, wherein in said step of adding from 1 to 5 g/l of said at least one additive are added to the fuel.

20. The method according to claim 19, wherein in said step of adding 2 g/l of said at least one additive are added to the fuel.

* * * * *